US010402147B2

(12) United States Patent
Gage (10) Patent No.: US 10,402,147 B2
(45) Date of Patent: Sep. 3, 2019

(54) VEHICLE MULTIMEDIA DISPLAY SYSTEM (71) Applicant: Toyota Motor Engineering & Manufacturing North America, Inc., Erlanger, KY (US)

(72) Inventor: Sergei Gage, Redford, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 0 days.

(21) Appl. No.: 15/423,096

(22) Filed: Feb. 2, 2017

(65) Prior Publication Data
US 2018/0129467 A1 May 10, 2018

Related U.S. Application Data (60) Provisional application No. 62/419,501, filed on Nov. 9, 2016.

(51) Int. Cl.
G09G 5/00 (2006.01)
G06F 3/14 (2006.01)
B60N 2/00 (2006.01)
H04N 21/414 (2011.01)

(52) U.S. Cl.
CPC .......... *G06F 3/1454* (2013.01); *B60N 2/002* (2013.01); *G09G 2380/10* (2013.01); *H04N 21/41422* (2013.01)

(58) Field of Classification Search
USPC ...... 345/2.2, 156, 173, 3.1, 174, 213; 701/1, 701/533; 705/14.58; 715/716, 853
See application file for complete search history.

(56) References Cited

U.S. PATENT DOCUMENTS

| 2005/0197747 | A1* | 9/2005 | Rappaport | H04L 67/12 701/1 |
| 2010/0117810 | A1* | 5/2010 | Hagiwara | G06F 3/0483 340/425.5 |
| 2011/0107272 | A1* | 5/2011 | Aguilar | G06F 3/04815 715/853 |

(Continued)

FOREIGN PATENT DOCUMENTS

| CN | 105516460 A | 4/2016 |
| CN | 105704009 A | 6/2016 |
| KR | 101413223 B1 | 6/2014 |

OTHER PUBLICATIONS

Aha™ Radio, http://www.infotainment.mazdahandsfree.com//entertainment-aharadio?language=en-NA, published Sep. 6, 2016.

*Primary Examiner* — Thuy N Pardo
(74) *Attorney, Agent, or Firm* — Dinsmore & Shohl LLP (57) ABSTRACT Vehicle multimedia display system is disclosed. The vehicle multimedia display system includes a plurality of displays communicatively coupled to a portable device, a processor communicatively coupled to the plurality of displays, a memory module communicatively coupled to the processor, and machine readable and executable instructions stored in the memory module. The vehicle multimedia system receives a selection of one or more displays among the plurality of displays, receives content from the portable device, and displays the content transmitted from the portable device on the selected one or more displays.

17 Claims, 7 Drawing Sheets (56) References Cited

U.S. PATENT DOCUMENTS

| | | | |
|---|---|---|---|
| 2011/0122074 A1* | 5/2011 | Chen | G01C 21/3688 |
| | | | 345/173 |
| 2011/0185390 A1 | 7/2011 | Faenger et al. | |
| 2012/0115418 A1* | 5/2012 | Preston | B60R 25/00 |
| | | | 455/41.2 |
| 2013/0138508 A1* | 5/2013 | Gee | H04W 4/021 |
| | | | 705/14.58 |
| 2014/0078022 A1* | 3/2014 | Dusterhoff | G06F 3/1423 |
| | | | 345/3.1 |
| 2014/0164579 A1 | 6/2014 | Douthitt et al. | |
| 2014/0365125 A1* | 12/2014 | Vulcano | G01C 21/36 |
| | | | 701/533 |
| 2015/0153936 A1* | 6/2015 | Lim | G06F 3/017 |
| | | | 715/716 |
| 2015/0193090 A1 | 7/2015 | Grover et al. | |
| 2015/0271452 A1 | 9/2015 | Guzman | |
| 2015/0339593 A1 | 11/2015 | Hakeem | |
| 2016/0154561 A1* | 6/2016 | Kato | G01C 21/3664 |
| | | | 345/173 |
| 2017/0137032 A1* | 5/2017 | Wuthnow | B60W 40/08 |
| | | | 345/2.2 |
| 2017/0253122 A1* | 9/2017 | Jun | B60K 35/00 |
| | | | 345/156 |
| 2018/0109762 A1* | 4/2018 | Aich | H04N 7/181 |
| | | | 345/173 |

* cited by examiner

VEHICLE MULTIMEDIA DISPLAY SYSTEM

CROSS-REFERENCE TO RELATED APPLICATIONS

This application claims priority to U.S. Provisional Patent Application No. 62/419,501 filed on Nov. 9, 2016, the entire contents of which are hereby incorporated by reference.

TECHNICAL FIELD

The present specification generally relates to vehicle multimedia display systems and, more specifically, to vehicle multimedia display systems that include a plurality of displays communicatively coupled to one or more portable devices.

BACKGROUND

Short-range wireless technology allows smartphones to be linked with vehicles. Once a smartphone is linked with a vehicle, a driver of the vehicle may place or receive a call through a telematics unit of the vehicle without manually operating the smartphone. Similarly, a driver of the vehicle may listen to music from the phone through a speaker system of the vehicle when the phone is linked to the vehicle. It may be desirable to display content received from linked smartphones.

Accordingly, a need exists for vehicle multimedia display systems that allow a driver or passengers to share content of the smartphone on one or more displays in a vehicle.

SUMMARY

In one embodiment, a multimedia display system includes a plurality of displays communicatively coupled to a portable device, a processor communicatively coupled to the plurality of displays, a memory module communicatively coupled to the processor, and machine readable and executable instructions stored in the memory module. The vehicle multimedia system receives a selection of one or more displays among the plurality of displays, receives content from the portable device, and displays the content transmitted from the portable device on the selected one or more displays.

In another embodiment, a method for sharing content in a vehicle having a plurality of displays is provided. The method includes displaying, on a display of the plurality of displays, one or more icons corresponding to the one or more displays respectively, receiving a selection of one or more displays among the plurality of displays, receiving content from a portable device communicatively coupled to the plurality of displays, and displaying the content transmitted from the portable device on the selected one or more displays.

In yet another embodiment, a method for sharing content in a vehicle having a plurality of in-vehicle displays includes receiving a selection of a first display among the plurality of in-vehicle displays from a portable device, receiving first content from the portable device, displaying, on the first display, the first content transmitted from the portable device, receiving a selection of a second display among the plurality of in-vehicle displays from the portable device, receiving second content from the portable device, the second content being different from the first content, and displaying, on the second display, the second content transmitted from the portable device.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 2:
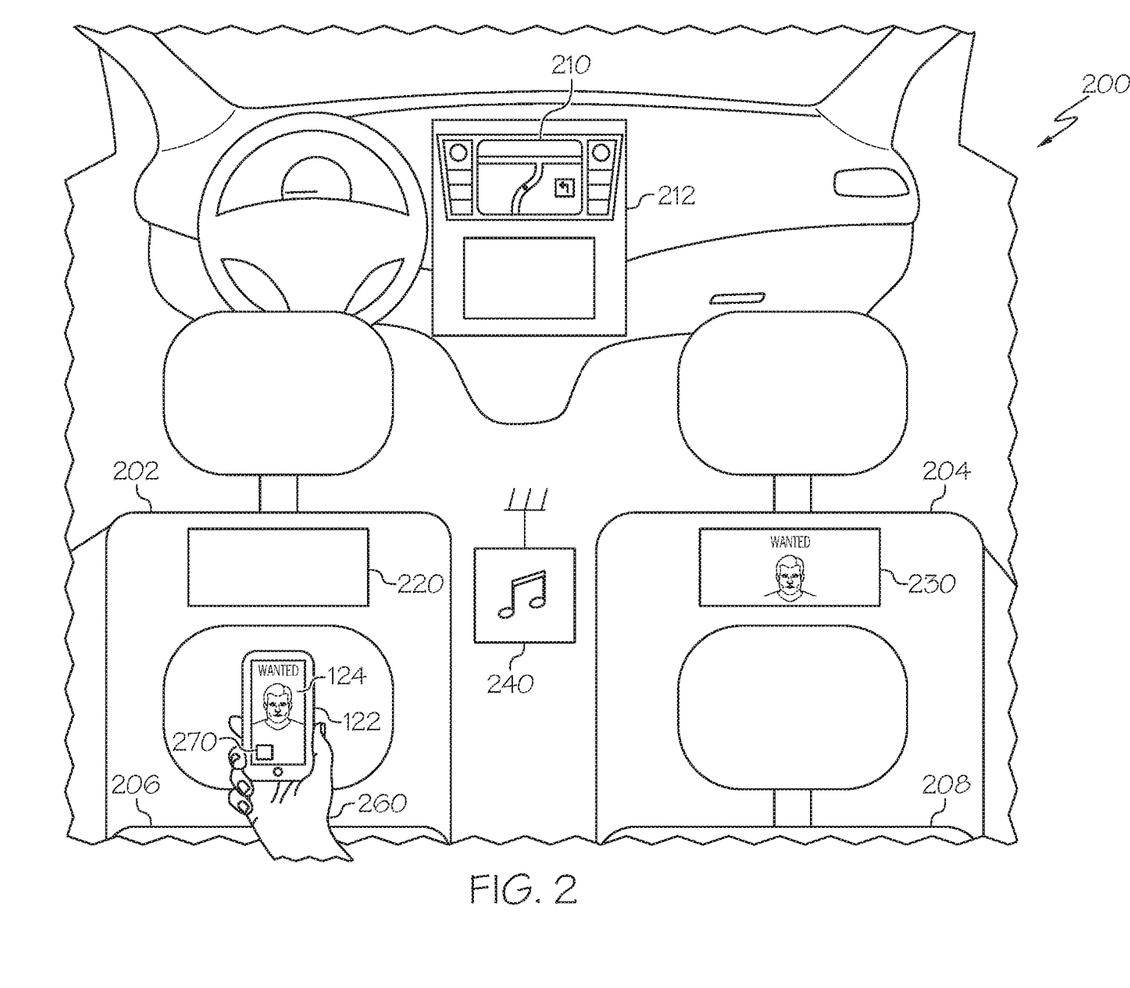
FIG. 2 schematically depicts an internal view of a vehicle according to one or more of embodiments shown and described herein.

The embodiments disclosed herein include vehicle multimedia display systems including a plurality of displays. Referring generally to FIG. 2, a vehicle multimedia display system described herein receives a selection one or more displays among the plurality of displays, receives content from a portable device, and displays the content transmitted from the portable device on the selected one or more displays. By displaying content from a portable device on one or more selected displays in a vehicle, the vehicle multimedia display systems described allow passengers to easily share his or her content with other passengers through one or more selected displays.

Figure 1:
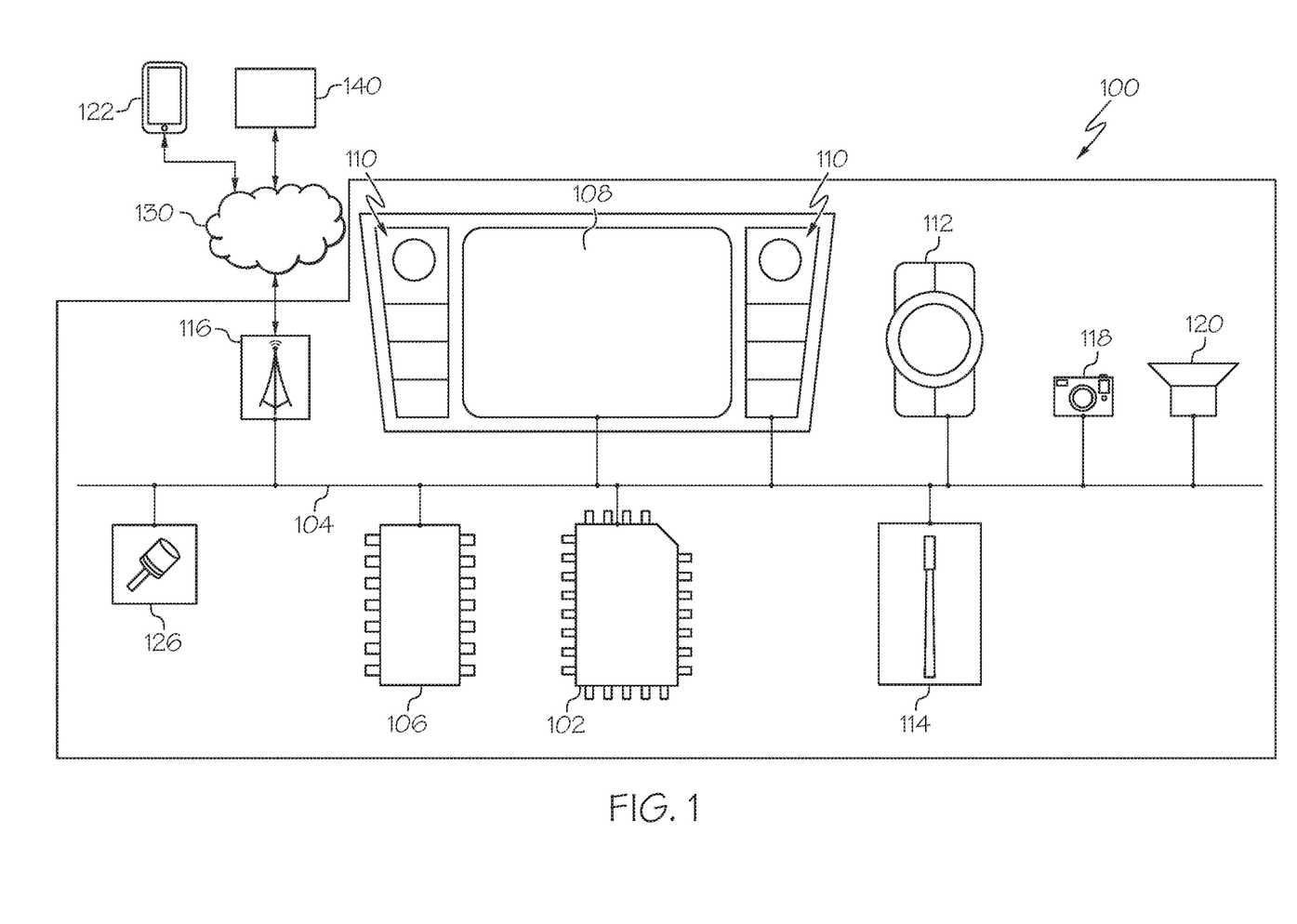
FIG. 1 schematically depicts a schematic vehicle multimedia display system according to one or more embodiments shown and described herein.

Referring now to FIG. 1, an embodiment of a vehicle multimedia display system 100 is schematically depicted. It is noted that, while the vehicle multimedia display system 100 is depicted in isolation, the vehicle multimedia display system 100 may be included within a vehicle in some embodiments, for example, within the vehicle 200 of FIG. 2. In embodiments in which the vehicle multimedia display system 100 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input. In some embodiments, the system may be embedded within a mobile device (e.g., smartphone, laptop computer, etc.) carried by a driver of the vehicle.

The vehicle multimedia display system 100 includes one or more processors 102. Each of the one or more processors 102 may be any device capable of executing machine readable and executable instructions. Accordingly, each of the one or more processors 102 may be a controller, an integrated circuit, a microchip, a computer, or any other computing device. The one or more processors 102 are coupled to a communication path 104 that provides signal interconnectivity between various modules of the system. Accordingly, the communication path 104 may communicatively couple any number of processors 102 with one another, and allow the modules coupled to the communication path 104 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi, Bluetooth, Near Field Communication (NFC) and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle multimedia display system 100 includes one or more memory modules 106 coupled to the communication path 104. The one or more memory modules 106 may comprise RAM, ROM, flash memories, hard drives, or any device capable of storing machine readable and executable instructions such that the machine readable and executable instructions can be accessed by the one or more processors 102. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 106. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In some embodiments, the one or more memory modules 106 may include a database that includes information on a plurality of displays in a vehicle. For example, the database may include locations of the plurality of displays, sizes of the plurality of the displays, functionalities supported by the plurality of displays such as a Bluetooth functionality.

Referring still to FIG. 1, the vehicle multimedia display system 100 comprises a plurality of displays 108 for providing visual output such as, for example, maps, navigation, entertainment, data received from an external device, or a combination thereof. Each of the plurality of displays 108 may output one of map, navigation, entertainment, and data received from an external device in response to a selection of corresponding function. Each of the plurality of displays 108 may be coupled to the communication path 104. Accordingly, the communication path 104 communicatively couples each of the plurality of displays 108 to other modules of the vehicle multimedia display system 100. Each of the plurality of displays 108 may include any medium capable of transmitting an optical output such as, for example, a cathode ray tube, light emitting diodes, a liquid crystal display, a plasma display, or the like. Moreover, each of the plurality of displays 108 may be a touchscreen that, in addition to providing optical information, detects the presence and location of a tactile input upon a surface of or adjacent to the display. Accordingly, each display may receive mechanical input directly upon the optical output provided by the display. Additionally, it is noted that each of the plurality of displays 108 can include at least one of the one or more processors 102 and the one or memory modules 106. The plurality of displays 108 may include the displays 210, 220, 230, and 240 shown in FIG. 2.

The depicted vehicle multimedia display system 100 comprises tactile input hardware 110 coupled to the communication path 104 such that the communication path 104 communicatively couples the tactile input hardware 110 to other modules of the vehicle multimedia display system 100. The tactile input hardware 110 may be any device capable of transforming mechanical, optical, or electrical signals into a data signal capable of being transmitted with the communication path 104. Specifically, the tactile input hardware 110 may include any number of movable objects that each transform physical motion into a data signal that can be transmitted to over the communication path 104 such as, for example, a button, a switch, a knob, a microphone or the like. In some embodiments, the display 108 and the tactile input hardware 110 are combined as a single module and operate as an audio head unit or an infotainment system. However, it is noted, that the display 108 and the tactile input hardware 110 may be separate from one another and operate as a single module by exchanging signals via the communication path 104.

The vehicle multimedia display system 100 optionally comprises a peripheral tactile input 112 coupled to the communication path 104 such that the communication path 104 communicatively couples the peripheral tactile input 112 to other modules of the vehicle multimedia display system 100. For example, in one embodiment, the peripheral tactile input 112 is located in a vehicle console to provide an additional location for receiving input. The peripheral tactile input 112 operates in a manner substantially similar to the tactile input hardware 110, i.e., the peripheral tactile input 112 includes movable objects and transforms motion of the movable objects into a data signal that may be transmitted over the communication path 104.

The vehicle multimedia display system 100 comprises a satellite antenna 114 coupled to the communication path 104 such that the communication path 104 communicatively couples the satellite antenna 114 to other modules of the vehicle multimedia display system 100. The satellite antenna 114 is configured to receive signals from global positioning system satellites. Specifically, in one embodiment, the satellite antenna 114 includes one or more conductive elements that interact with electromagnetic signals transmitted by global positioning system satellites. The received signal is transformed into a data signal indicative of the location (e.g., latitude and longitude) of the satellite antenna 114 or an object positioned near the satellite antenna 114, by the one or more processors 102. Additionally, it is noted that the satellite antenna 114 may include at least one of the one or more processors 102 and the one or memory modules 106. In some embodiments, the vehicle multimedia display system 100 does not include the satellite antenna 114.

Still referring to FIG. 1, in some embodiments, the vehicle multimedia display system 100 may be communicatively coupled to a server 140 (e.g., a social media network server) by a network 130. In one embodiment, the network 130 may include one or more computer networks (e.g., a personal area network, a local area network, or a wide area network), cellular networks, satellite networks and/or a global positioning system and combinations thereof. Accordingly, the vehicle multimedia display system 100 can be communicatively coupled to the network 130 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 1, the vehicle multimedia display system 100 comprises network interface hardware 116 for communicatively coupling the vehicle multimedia display system 100 to the server 140. The network interface hardware 116 can be communicatively coupled to the communication path 104 and can be any device capable of transmitting and/or receiving data via a network. Accordingly, the network interface hardware 116 can include a communication transceiver for sending and/or receiving any wired or wireless communication. For example, the network interface hardware 116 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 116 includes hardware configured to operate in accordance with the Bluetooth wireless communication protocol. Some embodiments may not include the network interface hardware 116.

Figure 5:
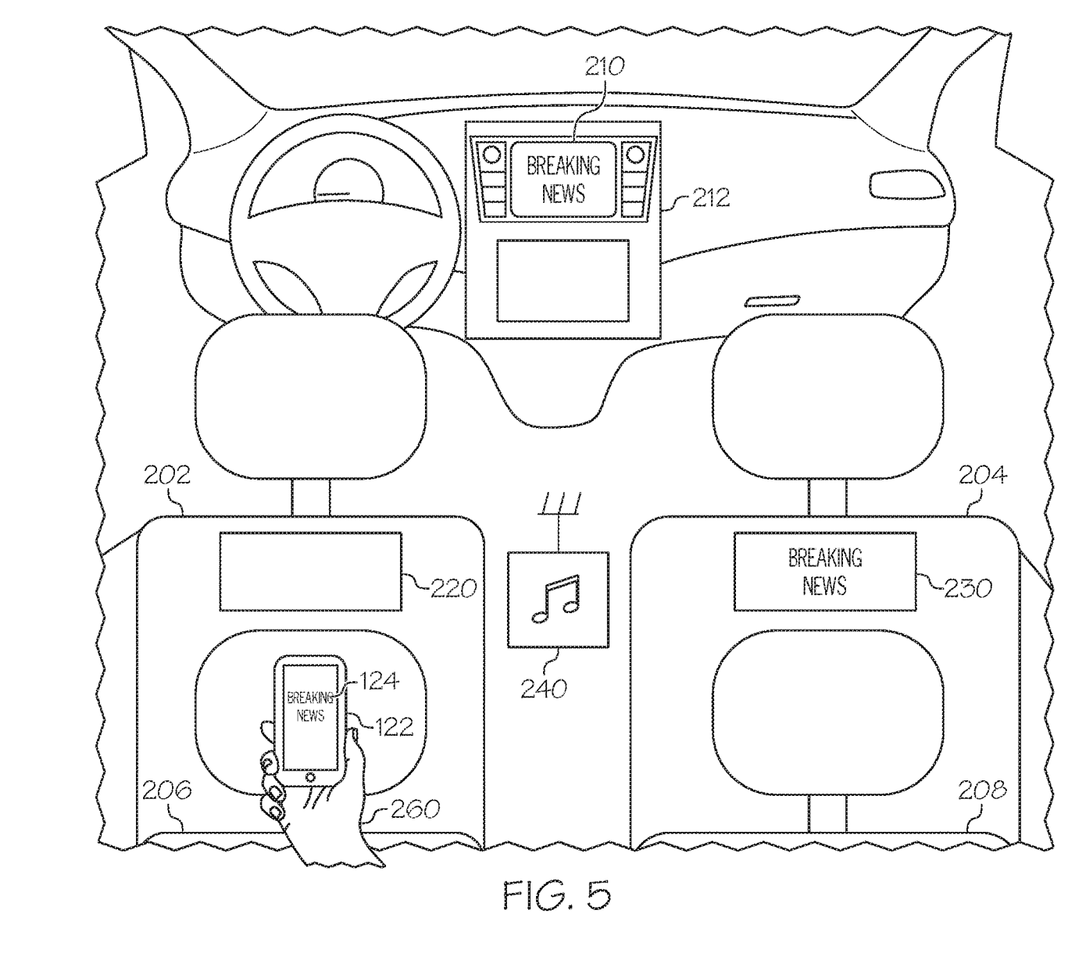
FIG. 5 schematically depicts an internal view of a vehicle according to one or more of embodiments shown and described herein.

Still referring to FIG. 1, the vehicle multimedia display system 100 may further comprise one or more cameras 118. Each of the one or more cameras 118 is coupled to the communication path 104 and communicatively coupled to the one or more processors 102. Each of the one or more cameras 118 may be any device having an array of sensing devices (e.g., pixels) capable of detecting radiation in an ultraviolet wavelength band, a visible light wavelength band, or an infrared wavelength band. Each of the one or more cameras 118 may have any resolution. The one or more cameras 118 may include an omni-directional camera, or a panoramic camera. In some embodiments, one or more optical components, such as a mirror, fish-eye lens, or any other type of lens may be optically coupled to at least one of the one or more cameras 118. The one or more cameras 118 may be used to capture an image of a seat arrangement inside the vehicle. The one or more cameras 118 may be located in a vehicle to capture a view of a passenger in the vehicle, for example, as shown in FIG. 5.

The vehicle multimedia display system 100 may further comprise a speaker 120 coupled to the communication path 104 such that the communication path 104 communicatively couples the speaker 120 to other modules of the vehicle multimedia display system 100. The speaker 120 transforms data signals from the vehicle multimedia display system 100 into audible mechanical vibrations. The speaker 120 may play audio streaming from an external device, such as a smartphone.

Still referring to FIG. 1, the vehicle multimedia display system 100 may be coupled to a portable device 122. For example, the vehicle multimedia display system 100 may be communicatively coupled to the portable device 122 via the network 130. As described above, the network 130 may include one or more computer networks (e.g., a personal area network, a local area network, or a wide area network), cellular networks, satellite networks and/or a global positioning system and combinations thereof. In some embodiments, the portable device 122 is coupled to the communication path 104 such that the communication path 104 communicatively couples the portable device 122 to other modules of the vehicle multimedia display system 100. The portable device 122 may include, without limitation, a smartphone, a tablet, a personal media player, or any other electric device that includes wireless communication functionality. The portable device 122 may include a display 124.

Still referring to FIG. 1, the vehicle multimedia display system 100 may further comprise an occupant detection sensor 126. The occupant detection sensor 126 is coupled to the communication path 104 such that the communication path 104 communicatively couples the occupant detection sensor 126 to other modules of the vehicle multimedia display system 100. The occupant detection sensor may include a proximity sensor. The proximate sensor detects a distance between the proximity sensor and an object nearby and communicates the proximity information to the electronic control unit of the vehicle. The proximity sensor may be any device capable of outputting a proximity signal indicative of a proximity of an object to the proximity sensor. In some embodiments, the proximity sensor may include a laser scanner, a capacitive displacement sensor, a Doppler effect sensor, an eddy-current sensor, an ultrasonic sensor, a magnetic sensor, an optical sensor, a radar sensor, a sonar sensor, or the like. Some embodiments may not include the proximity sensor. In some embodiments, the vehicle multimedia display system 100 may be configured to determine the presence of an object on a seat of a vehicle based on an output signal outputted by the proximity sensor. In some embodiments, the system 100 may be able to determine one or more characteristics of an object on the seat, such as, for example, the dimensions of the object (height, width, diameter, or the like) based on a proximity signal outputted by the occupant detection sensor 126. In other embodiments, the occupant detection sensor 126 may be a weight sensor. The weight sensor may be integrated into a vehicle seat, and measure a weight of an occupant in the seat.

Still referring to FIG. 1, the vehicle multimedia display system 100 can be formed from a plurality of modular units, i.e., the display 108, tactile input hardware 110, the peripheral tactile input 112, the portable device 122, and one or more cameras 118, can be formed as modules communicatively coupled form the vehicle multimedia display system 100. Accordingly, in some embodiments, each of the modules can include at least one of the one or more processors 102 and/or the one or more memory modules 106. Accordingly, it is noted that, while specific modules may be described herein as including a processor 102 and/or a memory module 106, the embodiments described herein can be implemented with the processors 102 and memory modules 106 distributed throughout various communicatively coupled modules.

FIG. 2 schematically depicts an internal view of a vehicle according to one or more of embodiments shown and described herein. The vehicle 200 may include front-row seats 202 and 204, and second-row seats 206 and 208, and third-row seats (not shown). The vehicle 200 may also include a plurality of displays including a display 210 on a head unit 212, displays 220 and 230 attached to the back of the front-row-seats 202 and 204 respectively, and a display 240 attached to a ceiling of the vehicle 200. Each of the displays 210, 220, 230, and 240 is included in the plurality of displays 108 in FIG. 1. In embodiments, each of the displays 210, 220, 230, and 240 may display the same content selected by a driver or a passenger operating on the head unit 212. In other embodiments, each of the displays 210, 220, 230, and 240 may display different content selected by a driver or passengers.

In embodiments, a passenger 260 is sitting on the third-row seat and holding a portable device 122. The portable device 122 includes a display 124 and is communicatively coupled to the displays 210, 220, 230, and 240 via the network 130 in FIG. 1, e.g., Bluetooth, NFC, Wi-Fi, etc. The passenger 260 may browse through social media content on the display 124 and when a share button 270 is pressed or touched, an interface for selecting one or more displays among the displays 210, 220, 230, and 240 may be displayed on the display 124. When one of the displays 210, 220, 230, and 240 is selected, the portable device 122 may stream the social media content to the selected display. For example, as shown in FIG. 2, the portable device 122 transmits the social media content that is displayed on the display 124 of the portable device 122 to the display 230 at the back of the front-row seat 204, and the display 230 mirrors the social media content from the portable device 122.

Figure 3A:
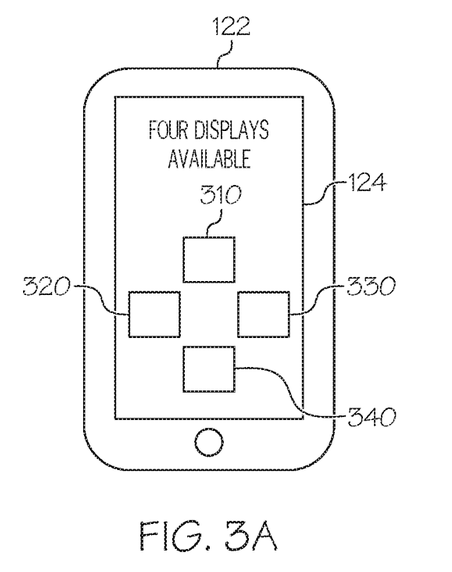
FIG. 3A depicts an interface for selecting one or more displays in accordance with one or more embodiments shown and described herein.
Figure 3B:
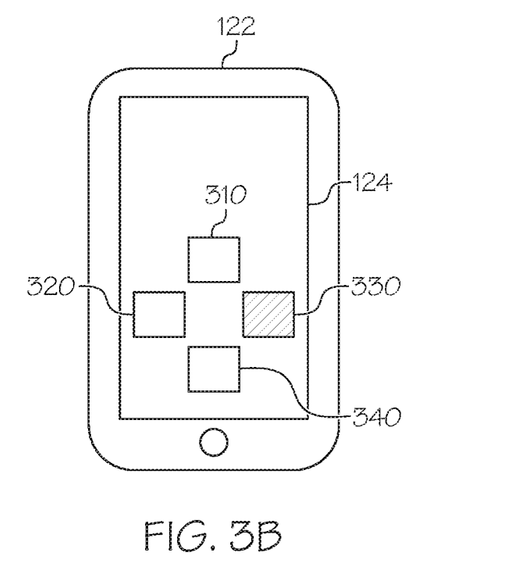
FIG. 3B depicts an interface for selecting one or more displays in accordance with one or more embodiments shown and described herein.
Figure 3C:
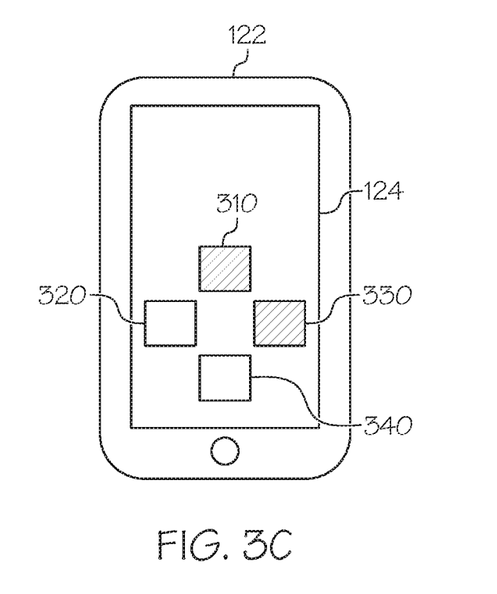
FIG. 3C depicts an interface for selecting one or more displays in accordance with one or more embodiments shown and described herein.

FIGS. 3A-3C depict an interface for selecting one or more displays in accordance with one or more embodiments shown and described herein. When the passenger 260 presses or touches the share button 270 shown in FIG. 2, the display 124 of the portable device 122 displays an interface for selecting one or more displays. In embodiments, the display 124 may show a massage "Four displays are available," and four icons 310, 320, 330, and 340 which correspond to displays 210, 220, 230, and 240 in FIG. 2 respectively. The four icons 310, 320, 330, and 340 may be displayed on the display 124 in a similar arrangement as the displays 210, 220, 230 and 240 arranged in the vehicle 200 as shown in FIG. 3A. The portable device 122 may display the four icons 310, 320, 330, and 340 on the display 124 based on location information on the displays 210, 220, 230, and 240. For example, the location of the displays 210, 220, 230, and 240 may be determined based transmission time and orientation of signals between the displays 210, 220, 230, and 240 and the portable device 122. In another example, the location information may be stored in the memory module 106 of the vehicle multimedia display system and transmitted to the portable device 122.

In some embodiments, icons to be displayed on the display 124 may be selectively determined based on the presence of a driver or passengers. The one or more processors 102 may receive an output of the occupant detection sensor 126, and based on the output from the occupant detection sensor 126, the one or more processors 102 may send to the display 124 instructions for displaying icons which correspond to displays proximate to seats occupied by a driver or passengers. For example, when no passenger is present in the second-row seats 206 and 208, the one or more processors 102 instructs the display 124 to display icons 310 and 340 only, and icons 320 and 330 corresponding to the displays 220 and 230 may not be displayed on the display 124 because there is no occupant that would see the display 220 or 230. In other embodiments, icons to be displayed on the display 124 may be selectively determined based on driving conditions of the vehicle 200. For example, the icon 310 corresponding to the display 210 may not be displayed on the display 124 when it is determined that the vehicle 200 is in a driving mode (e.g., based on an input from a speed sensor, a transmission gear position sensor, etc.) in order to prevent the distraction of a driver.

When the passenger 260 presses or touches the icon 330, the icon 330 is highlighted as shown in FIG. 3B. Then, the content that is being displayed on the display 124 is transmitted or streamed to the display 230 and the content is mirrored on the display 230 as shown in FIG. 2. In some embodiments, the passenger 260 may choose two or more displays to share content from her portable device 122. For example, the passenger 260 may press or touch the icons 310 and 330 to select the displays 210 and 230 to share content. Then, the content that is being displayed on the display 124 is transmitted to the displays 210 and 230 respectively, and the content is mirrored on the displays 210 and 230 as shown in FIG. 5.

Figure 4A:
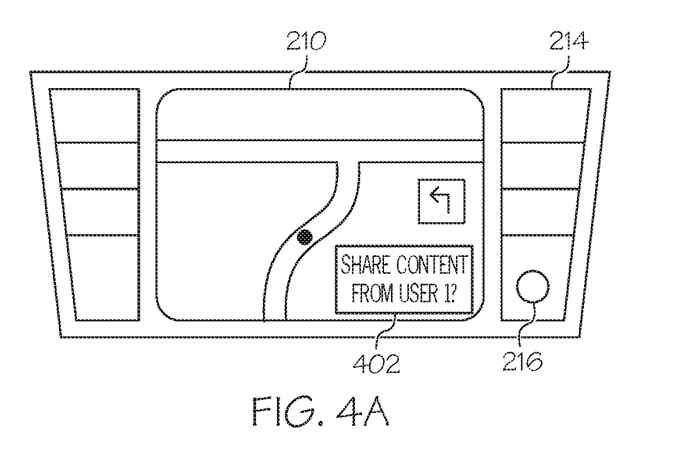
FIG. 4A depicts an interface of one of the plurality of displays in accordance with one or more embodiments described and shown herein.
Figure 4B:
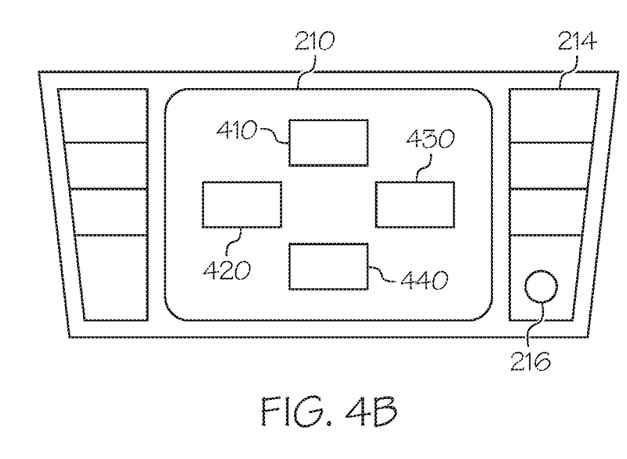
FIG. 4B depicts an interface of one of the plurality of displays in accordance with one or more embodiments described and shown herein.
Figure 4C:
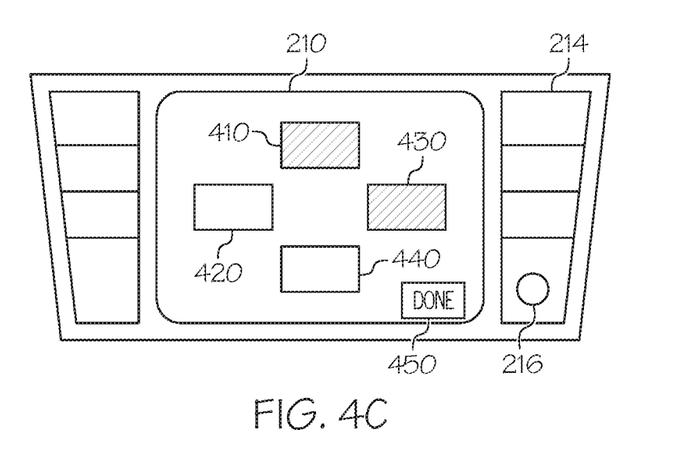
FIG. 4C depicts an interface of one of the plurality of displays in accordance with one or more embodiments described and shown herein.
Figure 4D:
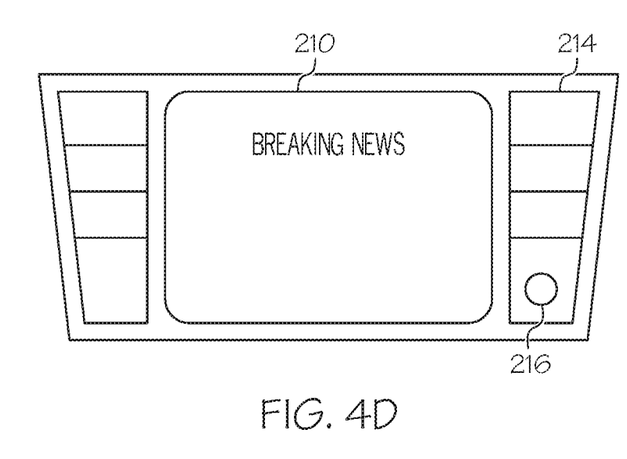
FIG. 4D depicts an interface of one of the plurality of displays in accordance with one or more embodiments described and shown herein.

FIGS. 4A-4D depict an interface of one of the plurality of displays in accordance with one or more embodiments described and shown herein. In FIG. 4A, the display 210 is in a navigation mode. When the display 210 detects a presence of the portable device 122 closed to the display and content from the portable device 122 is available to share, the display 210 may show a message 402. The display 210 may receive identification information on the user of the portable device 122 and the massage 402 may be determined, for example, "Share content from User 1?" In embodiments, in response to a press of a button 216 or a touch or press on the message 402, the display 210 may display a plurality of icons 410, 420, 430, and 440 which correspond to the displays 210, 220, 230, and 240 respectively, as shown in FIG. 4B. In other embodiments, in response to a press of a button 216 on tactile input hardware 110 or a touch or press on the message 402, the display 210 may display content that is transmitted from the portable device 122 as shown in FIG. 4D.

One or more icons on the display 210 may be selected by a driver or a passenger. For example, the icons 410 and 430 are selected to share content from the portable device 122 as shown in FIG. 4C. The selection of the icons may be made by touching on the icons or input to the tactile input hardware 214. After the selection of the icons 410 and 430, the driver or the passenger may initiate sharing content from the portable device 122 on the selected displays, for example, by touching a button 450 or any other button associated with the initiation. Then, the display 210 may initiate displaying content from the portable device 122 as shown in FIG. 4D. At the same time, the other selected display 230 may also initiate displaying content from the portable device 122 as shown in FIG. 5. That is, the content displayed on the display 124 is mirrored to the display 210 and the display 230.

Figure 6:
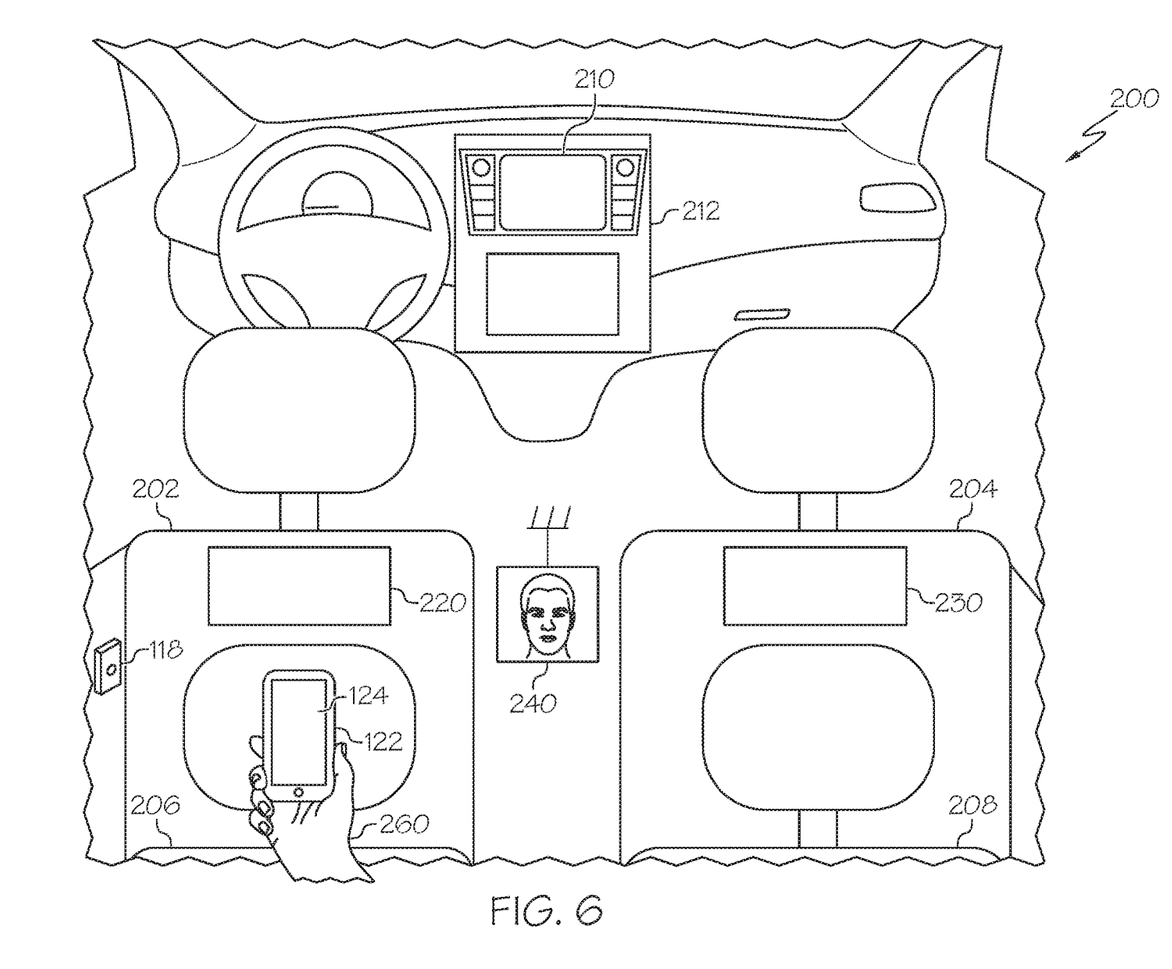
FIG. 6 depicts sharing content captured by a camera in a vehicle in accordance with one or more embodiments described and shown herein.

FIG. 6 depicts sharing content captured by a camera in a vehicle in accordance with one or more embodiments described and shown herein. The vehicle 200 may include a camera 118 that is communicatively coupled to the portable device 122. The passenger 260 may operate the camera 118 using the portable device 122. For example, the passenger 260 may take a selfie image by pressing a button on the portable device 122 or touching on the display 124 of the portable device 122. When an image or video of the passenger 260 is captured by the camera 118, the captured image or video may be displayed on one or more of the plurality of displays 210, 220, 230 and 240. The selection of displays may be made in a similar way as described with reference to FIGS. 3A-3C and 4A-4D.

In embodiments, the captured image or video may be displayed on the display 240 as shown in FIG. 6. The captured image or video may be uploaded to the server 140 such as a social network server or streamed to a media streamlining service. Before uploading the content, the passenger 260 may be prompted on the display 124 whether to approve of sharing information, such as by displaying a dialog box on the display 124 and the passenger 260 may touch or otherwise select to indicate approval of the request to share. The passenger 260 may also be provided with an option to add additional information (e.g., a textual description, a note, etc.) to image or video data before publication to a media streaming service or social media network. In embodiments, such additional information may be added to the image or video using one or more of the displays 210, 220, 230, and 240 and/or an application running on the portable device 122. In some embodiments, images or videos may be automatically tagged with location information, which may be obtained from the satellite antenna 114. In other embodiments, other information related to the driving experience may also be added to the image or video, such as traffic information, speed information, weather information, or the like.

Figure 7:
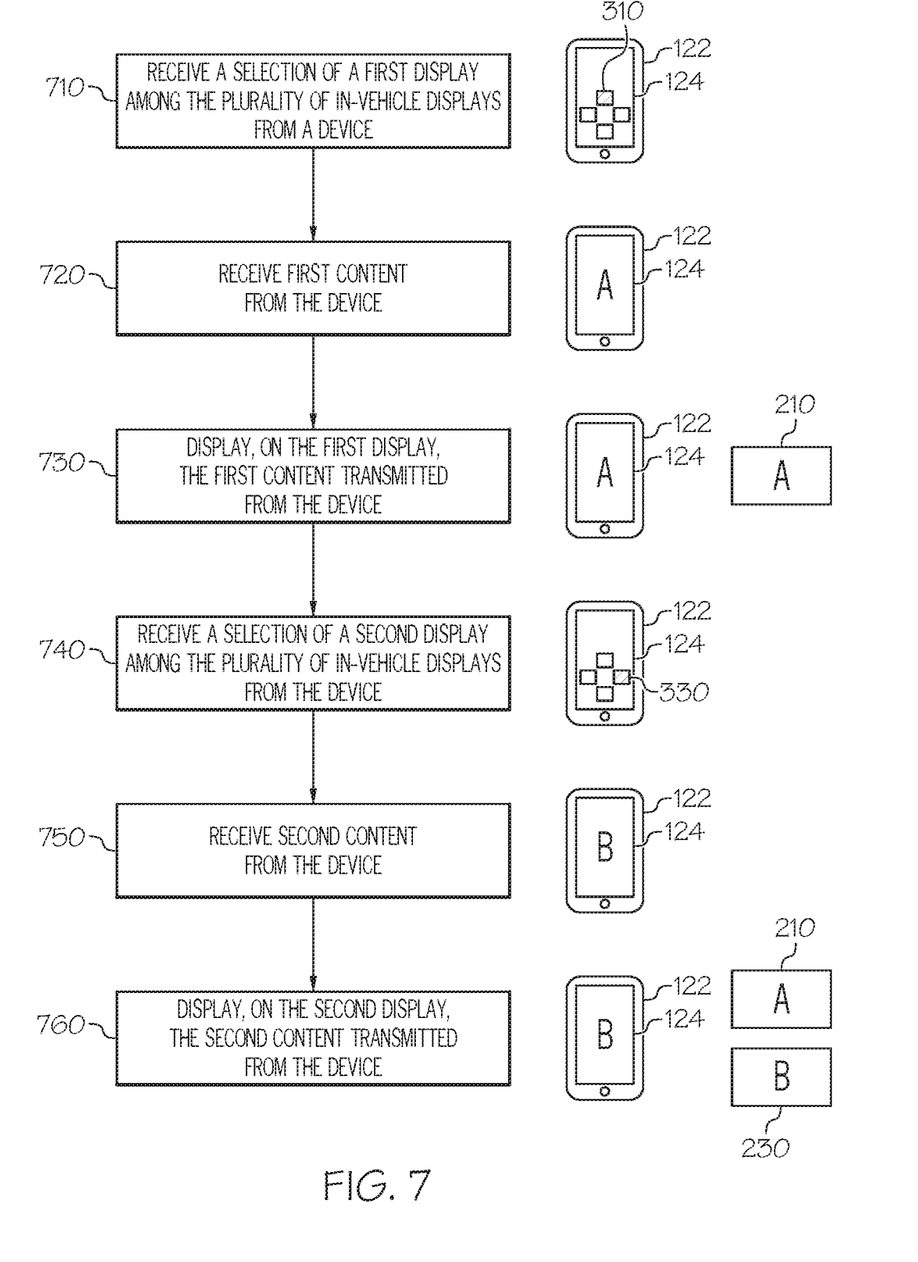
FIG. 7 depicts a flow chart and a corresponding display system in accordance with one or more embodiments described and shown herein.

FIG. 7 depicts a flow chart and a corresponding display system in accordance with one or more embodiments described and shown herein. In step 710, the vehicle multimedia display system 100 may receive a selection of a first display among the plurality of in-vehicle displays from the portable device 122. For example, a selection of an icon 310 (highlighted) on the display 124 of the portable device 122 is communicated to the one or more processor 102 of the vehicle multimedia display system 100. Then, the one or more processor 102 may activate the display 210 corresponding to the icon 310 to initiate displaying. In some embodiments, the display selection may be made by manipulating one or more of the plurality of displays 108 (including displays 210, 220, 230, and 240).

In step 720, the vehicle multimedia display system 100 may receive first content from the portable device 122. For example, the portable device 122 displays content A on the display 124 and transmits the content A to the display 210. In step 730, the first display may display the first content transmitted from the portable device 122. For example, the display 210 displays the content A which is also displayed on the portable device 122.

In step 740, the vehicle multimedia display system 100 may receive a selection of a second display among the plurality of in-vehicle displays from the portable device 122. For example, a selection of an icon 330 (highlighted) on the display 124 of the portable device 122 is communicated to the one or more processor 102 of the vehicle multimedia display system 100. Then, the one or more processor 102 may activate the display 230 corresponding to the icon 330 to initiate displaying.

In step 750, the vehicle multimedia display system 100 may receive second content from the portable device 122. For example, the passenger 260 may change content displayed on the display 124, and the portable device 122 now displays content B and transmits the content B to the display 230. In step 760, the second display may display the second content transmitted from the portable device 122. For example, the display 230 displays the content B which is also displayed on the portable device 122 while the display 210 is displaying the content A which was previously displayed on the portable device 122.

It should be understood that embodiments described herein are directed to vehicle multimedia display systems including a plurality of displays communicatively coupled to a portable device. The vehicle multimedia display systems described herein receives a selection one or more displays among the plurality of displays, receives content from the device, and displays the content transmitted from the device on the selected one or more displays. By displaying content from a portable device on one or more selected displays in a vehicle, the vehicle multimedia display systems described allow passengers to conveniently share his or her content with other passengers through one or more selected displays.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle multimedia display system, comprising:
   a plurality of displays communicatively coupled to a portable device, the plurality of displays being positioned at different locations within a vehicle;
   one or more sensors configured to detect a presence of occupants on seats of the vehicle, a processor communicatively coupled to the plurality of displays;
   a memory module communicatively coupled to the processor; and
   a controller comprising the processor and the memory module storing machine readable and executable instructions that, when executed by the processor, cause the vehicle multimedia display system to perform at least the following when executed by the processor:

determine, among the seats, one or more seats occupied by one or more occupants based on data from the one or more sensors;

determine one or more displays proximate to the one or more seats occupied by the one or more occupants; and instruct a display of the portable device to display one or more icons corresponding to the one or more displays proximate to the one or more seats occupied by the one or more occupants and not to display one or more icons corresponding to one or more displays proximate to one or more unoccupied seats in response to determining the one or more displays proximate to the one or more seats occupied by the one or more occupants.

2. The vehicle multimedia display system of claim 1, wherein the processor communicates information on the plurality of displays to the portable device.

3. The vehicle multimedia display system of claim 2, wherein the information on the plurality of displays comprises identifications of the plurality of displays.

4. The vehicle multimedia display system of claim 2, wherein the information on the plurality of displays comprises locations of the plurality of displays within the vehicle.

5. The vehicle multimedia display system of claim 1, further comprising:
a camera communicatively coupled to the processor and configured to capture a view external to the vehicle.

6. The vehicle multimedia display system of claim 1, further comprising:
a camera communicatively coupled to the processor and configured to:
capture an image or video of a driver or passengers within the vehicle; and
transmit the captured image or video to the controller,
wherein the machine readable and executable instructions that, when executed by the processor, cause the vehicle multimedia display system to send the captured image or video to the portable device.

7. The vehicle multimedia display system of claim 6, wherein the captured image or video is displayed on one of the plurality of displays.

8. The vehicle multimedia display system of claim 1, wherein the machine readable and executable instructions, when executed by the processor, cause the vehicle multimedia display system to:
receive a selection of at least one display among the plurality of displays from the portable device in the vehicle;
receive content from the portable device; and
display the content transmitted from the portable device on the at least one display.

9. The vehicle multimedia display system of claim 1, wherein the machine readable and executable instructions stored in the memory module that, when executed by the processor, cause the vehicle multimedia display system to send to the portable device an instruction for displaying icons corresponding to the one or more displays on a display of the portable device.

10. The vehicle multimedia display system of claim 1, further comprising:
a speaker communicatively coupled to the portable device and configured to play audio content received from the portable device.

11. A method for sharing content in a vehicle having a plurality of displays, comprising:
determining, among seats of the vehicle, one or more seats occupied by one or more occupants based on data from one or more sensors in the vehicle;
determining one or more displays proximate to the one or more seats occupied by the one or more occupants; and
instructing a display of a portable device to display one or more icons corresponding to the one or more displays proximate to the one or more seats occupied by the one or more occupants and not to display one or more icons corresponding to one or more displays proximate to one or more unoccupied seats in response to determining the one or more displays proximate to the one or more seats occupied by the one or more occupants.

12. The method of claim 11, wherein the content from the portable device includes video data.

13. The method of claim 11, wherein locations of the one or more icons on the display are determined based on locations of the one or more displays within the vehicle.

14. The method of claim 11, further comprising:
displaying, on a portable device, one or more icons corresponding to one or more displays of the plurality of displays respectively;
receiving a selection of one or more displays among the plurality of displays from the portable device;
receiving content from the portable device communicatively coupled to the plurality of displays; and
displaying the content transmitted from the portable device on the selected one or more displays.

15. A method for sharing content in a vehicle having a plurality of in-vehicle displays, comprising:
determining, among seats of the vehicle, one or more seats occupied by one or more occupants based on data from one or more sensors in the vehicle;
determining one or more displays proximate to the one or more seats occupied by the one or more occupants;
instructing a display of a portable device to display one or more icons corresponding to the one or more displays proximate to the one or more seats occupied by the one or more occupants and not to display one or more icons corresponding to one or more displays proximate to one or more unoccupied seats in response to determining the one or more displays proximate to the one or more seats occupied by the one or more occupants;
receiving a selection of a first display among the one or more displays from a portable device;
receiving first content from the portable device;
displaying, on the first display, the first content transmitted from the portable device;
receiving a selection of a second display among the one or more displays from the portable device;
receiving second content from the portable device, the second content being different from the first content; and
displaying, on the second display, the second content transmitted from the portable device.

16. The method of claim 15, wherein the second content is displayed on the second display while the first content is displays on the first display.

17. The method of claim 15, further comprising
sending, to the portable device, an instruction for displaying icons corresponding to the plurality of displays on a display of the portable device.

* * * * *